United States Patent
Habetha et al.

(10) Patent No.: US 9,210,719 B2
(45) Date of Patent: Dec. 8, 2015

(54) METHOD FOR ACCESS TO A MEDIUM BY A MULTI-CHANNEL DEVICE

(75) Inventors: Jörg Habetha, Aachen (DE); Stefan Mangold, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 2074 days.

(21) Appl. No.: 10/595,827

(22) PCT Filed: Nov. 10, 2004

(86) PCT No.: PCT/IB2004/052370
§ 371 (c)(1),
(2), (4) Date: Jun. 7, 2007

(87) PCT Pub. No.: WO2005/050918
PCT Pub. Date: Jun. 2, 2005

(65) Prior Publication Data
US 2007/0297353 A1    Dec. 27, 2007

(30) Foreign Application Priority Data
Nov. 19, 2003   (EP) .................................. 03104273

(51) Int. Cl.
*H04W 74/02* (2009.01)
*H04W 74/08* (2009.01)

(52) U.S. Cl.
CPC .......... *H04W 74/02* (2013.01); *H04W 74/0816* (2013.01)

(58) Field of Classification Search
USPC ......... 370/229, 230, 300, 302, 304, 326, 329, 370/330, 343, 345, 390, 431, 432, 433, 436, 370/445, 450, 454, 459, 468, 470, 471, 474, 370/478, 482, 492, 498, 506, 507, 509, 518, 370/536
See application file for complete search history.

(56) References Cited

U.S. PATENT DOCUMENTS 4,704,716 A * 11/1987 Bowers et al. ................ 370/371
4,797,879 A *  1/1989 Habbab et al. ................. 398/51
5,586,120 A * 12/1996 Cadd ............................ 370/468

(Continued)

FOREIGN PATENT DOCUMENTS

EP       0294133 A2    7/1988
JP    2003319449 A   11/2003

(Continued)

OTHER PUBLICATIONS

IEEE Standard for Information Technology 802.11 (1999) "Part 11: Wireless LAN Medium Access Control (MAC) and Physical Layer (PHY) specifications: High-speed Physical Layer in the 5GHz Band"; published Dec. 30, 2009.*

(Continued)

*Primary Examiner* — Benjamin H Elliott, IV

(57) ABSTRACT

Method of accessing a medium on a transmission system having at least two channels, in which a multi-channel device groups at least two channels for the purpose of increasing the bandwidth. The method enables multi-channel devices and single-channel devices to coexist by sending out a preamble and header on each individual channel before the channels are grouped, a single-channel device that may be scanning the channel thus detecting that the message that follows is not intended for itself.

27 Claims, 4 Drawing Sheets

(56) References Cited

U.S. PATENT DOCUMENTS

| | | | |
|---|---|---|---|
| 5,619,498 A * | 4/1997 | Sharpe | 370/396 |
| 5,745,837 A | 4/1998 | Fuhrmann | |
| 5,787,080 A | 7/1998 | Hulyalkar et al. | |
| 6,115,390 A * | 9/2000 | Chuah | 370/443 |
| 6,215,798 B1 * | 4/2001 | Carneheim et al. | 370/515 |
| 6,240,140 B1 * | 5/2001 | Lindbergh et al. | 375/260 |
| 6,925,070 B2 * | 8/2005 | Proctor, Jr. | 370/335 |
| 7,016,676 B2 * | 3/2006 | Walke et al. | 455/434 |
| 7,027,462 B2 * | 4/2006 | Benveniste | 370/447 |
| 7,039,412 B2 * | 5/2006 | Sandhu et al. | 455/445 |
| 7,075,890 B2 * | 7/2006 | Ozer et al. | 370/230 |
| 7,092,374 B1 * | 8/2006 | Gubbi | 370/338 |
| 7,289,529 B2 * | 10/2007 | Sherman | 370/461 |
| 7,310,670 B1 * | 12/2007 | Walbeck et al. | 709/225 |
| 7,321,762 B2 * | 1/2008 | Hoeben | 455/412.2 |
| 7,366,151 B2 * | 4/2008 | Kubler et al. | 370/338 |
| 7,415,046 B2 * | 8/2008 | Beckmann et al. | 370/537 |
| 7,418,004 B2 * | 8/2008 | Chou | 370/449 |
| 7,436,801 B1 * | 10/2008 | Kanterakis | 370/329 |
| 7,551,948 B2 * | 6/2009 | Meier et al. | 455/574 |
| 2002/0032031 A1 * | 3/2002 | Ogino et al. | 455/435 |
| 2002/0109879 A1 * | 8/2002 | Wing So | 359/118 |
| 2003/0091066 A1 * | 5/2003 | Choi et al. | 370/468 |
| 2004/0072559 A1 * | 4/2004 | Kakumaru et al. | 455/422.1 |
| 2004/0242252 A1 | 12/2004 | Hoeben | |
| 2005/0111402 A1 * | 5/2005 | Sawada et al. | 370/328 |

FOREIGN PATENT DOCUMENTS

| | | |
|---|---|---|
| JP | 2003348641 A | 12/2003 |
| JP | 2006521758 A | 9/2006 |
| WO | 0171981 A2 | 9/2001 |
| WO | 0182550 A2 | 11/2001 |
| WO | 200408886 A2 | 10/2004 |

OTHER PUBLICATIONS

IEEE Standard 802.11A, Part II: Wireless Lan Medium Access Control (MAC) and Physical Layer (PHY) Specification: High-Speed Physical Layer in the 5GHz Band, 1999, 86 page Document.

Mangold et al, "IEEE 802.11E Wireless Lan for Quality of Service", February 2002, XP002251598, pp. 1-8.

* cited by examiner

METHOD FOR ACCESS TO A MEDIUM BY A MULTI-CHANNEL DEVICE

The invention relates to methods for access to a medium by a multi-channel device. The medium comprises a transmission system having at least two channels on which a message to be transmitted comprises at least a preamble and a header plus a succeeding data field. The data field may contain either user data, which is termed "useful data", or control information, for coordinating the access to the medium for example. A method for decentralized medium access and a method for centralized medium access are claimed.

The frequency band of a transmission system is often divided into sub-bands, which are termed channels, on which either a single communications link or else a complete cell of a system operates. The latter is the case with for example 802.11a/e and HiperLAN/2 wireless local area networks (WLANs). With regard to 802.11a/e WLANs, the basic specification, namely ANSI/IEEE Std 802.11, 1999 edition, and "IEEE Std 801.11a-1999: High-speed Physical Layer in the 5 GHz Band, Supplement to Standard IEEE 802.11", IEEE New York, September 1999 and "IEEE Std 802.11e/D4.2: Medium Access Control (MAC) Enhancements for Quality of Service (QoS), Draft Supplement to Standard IEEE 802.11", IEEE New York, February 2003, are hereby incorporated by reference.

The bandwidth of the channel sets a limit to the maximum data rate that can be obtained between two stations in a cell, or in other words to the capacity of a cell. One possible way of increasing the capacity of a transmission system is to enlarge the bandwidth of a communications channel. With a preset channel definition, this can be achieved by grouping two or more channels to obtain one channel of greater width. This approach is known in theory and has been implemented in certain WLAN systems, in which a high data rate is obtained or a what is called "turbo" mode of handling.

There are a certain number of stations in a transmission system, and of these two or more at a time make a temporary connection with one another. The grouping of channels can only be performed if all the stations involved operate in the mode where the data rate is high. For channel grouping, there has to be one standard for all the stations or terminals. However, mobile telecommunications is the very area in which there are a variety of manufacturers of terminals and the terminals employ channel grouping that is not standardized. Because channel grouping, as a performance feature, entails additional expenditure in development and manufacture, it may also be the case that, because of the cost, a manufacturer of terminals offers on the one hand terminals employing channel grouping and on the other hand terminals that do not have this performance feature. Also, older terminals that were developed and sold before channel grouping was introduced in transmission systems are incapable of operating in the mode having the high data transmission rate.

Standard IEEE 802.11e combines both a decentralized and a centralized scheme for medium access. An algorithm that can be used for this will be explained by taking the 802.11 system as an example. The basic 802.11 MAC protocol is the distributed coordination function (DCF), that operates as a listen-before-talk scheme. The distributed coordination function is based on carrier multiple sense access (CMSA). Having found that no other transmissions are underway on the wireless medium, the stations emit MAC service data units (MSDUs) of an arbitrary length of up to 2304 bytes. If, however, two stations find that a channel is free at the same time, a collision occurs when the data is sent out over the radio-transmitting medium, namely air, that they both use.

The 802.11 MAC protocol defines a mechanism for collision avoidance (CA) to reduce the probability of collisions of this kind. It is part of the collision avoidance mechanism that, before it starts transmitting, a station performs a waiting or backoff process. The station continues listening out on the channel for an additional, random period of time after it finds that the channel is free. Only if the channel remains free for this additional random length of time is the station permitted to initiate a transmission. This random waiting time is composed of a constant portion, the what is called DCF interframe space (DIFS), which is 34 µs long in the case of the 802.11a MAC protocol, and a random portion whose length is between zero and a maximum time. The DIFS space is thus the minimum possible waiting time for the stations. The length of the random portion of the waiting time is obtained as a multiple of the length of a time slot (slot time), which length is 9 µs in the 802.11a MAC protocol. Each station draws a random value, for the number of slot times to be waited, which it stores in the what is called contention window (CW). On the expiry of each period of 9 µs, the value of the CW is decremented by 1.

Each time a data frame is successfully received, the receiving station immediately sends out an acknowledgement frame (ACK). The size of the contention window is enlarged if a transmission fails, which means that a data frame sent out has not been acknowledged. After each failed attempt at a transmission, a new medium access is effected after a fresh waiting time, with the fresh waiting time being selected to be twice as long as the current contention window. This reduces the likelihood of a collision in the event that a plurality of stations are trying to gain access to the channel. Those stations that deferred channel access during the time when the channel was busy do not select a new random waiting time but continue the countdown of the time for the deferred medium access on finding that the channel is idle again. In this way, stations that deferred channel access due to their longer random waiting time as compared with other stations are given a higher priority when they resume their efforts to start a transmission. After each successful transmission, the transmitting station performs a new random waiting process (backoff) even if it does not have a further MSDU to send at the time. This is what is called the "post backoff", because this waiting process takes place after rather than before a transmission.

There is a situation under the 802.11 MAC protocol in which a station does not have to perform a waiting process of random duration (a backoff) before it can start transmitting data. This situation arises if an MSDU from a higher layer arrives at a station and the post-backoff for the last transmission has already been completed, or in other words, there is no queue and, in addition, the channel has been idle for a minimum DIFS time. All subsequent MSDUs that arrive after this MSDU will be transmitted after a random waiting time until there is again no queue.

To limit the probability of long frames colliding and being transmitted more than once, data frames are also fragmented. A long MSDU can be divided by fragmentation into a plurality of small data frames, i.e. fragments, that can be transmitted sequentially as data frames to be acknowledged individually. The advantage of fragmentation is that, if a transmission fails, this failure can be detected at an earlier point in time and hence less data has to be re-transmitted.

In systems using CSMA, there is a problem with hidden stations. This is a problem inherent in the CSMA system and to alleviate it the system defines a request-to-send/clear-to-send (RTS/CTS) mechanism that can be used as an option. Before data frames are transmitted, it is possible for a system to send a short RTS frame, which is followed by a CTS transmission from the receiving station. The RTS and CTS frames contain information on the length of the transmission time of the next data frame, i.e. the first fragment, and of the corresponding ACK response. What is achieved in this way is that other stations near the transmitting station, and hidden stations near the receiving station, do not start a transmission, because they set a counter, the what is called Network Allocation Vector (NAV). The RTS/CTS mechanism helps to protect long data frames against hidden stations. With fragmentation, a large number of ACKs are transmitted, whereas with RTS/CTS the MSDU can be transmitted efficiently in a single data frame. Between each successive pair of frames in the sequence RTS frame, CTS frame, data frame and ACK frame, there is a short interframe space (SIFS), which is 16 µs long under 802.11a.

FIG. 1, which relates to the prior art, is a diagram showing an example of a distributed coordination function (DCF). A short interframe space (SIFS) is shorter than a DCF interframe space (DIFS), as a result of which CTS responses and acknowledgement frames (ACKs) always have the highest priority for access to the wireless medium. In the latest version of the MAC protocol, the 802.11e protocol, an Enhanced Distribution Coordination Function (EDCF) has been introduced, which still operates in the same way but, in addition, supports different types of traffic, such as, for example, access priorities. In the time-based diagram for six stations shown in FIG. 1, although station 6 cannot detect the RTS frame of the station 2 that is transmitting, it can detect the CTS frame of station 1.

Another known function, the Hybrid Coordination Function (HCF) extends the rules for (E)DCF access. A crucial performance feature of 802.11e MAC is the Transmission Opportunity (TXOP). A TXOP is defined as the interval between the point at which a station receives the right to initiate a transmission, defined by the starting time, and a maximum duration. TXOPs are allocated by way of contentions (EDCF-TXOP) or are granted by HCF (polled TXOP). Only one station in the cell, which is called the hybrid coordinator (HC), can give other stations permission to transmit, i.e. can grant a TXOP. The duration of a polled TXOP is specified by the time field within the allocating frame. The hybrid coordinator is able to allocate TXOPs to itself, to enable MSDU transmissions to be initiated, at any time, but only on detecting that the channel is idle for a time equal to a PIFS (Point Coordinator Interframe Space), which time is shorter than the length of a DIFS.

Defined as part of the 802.11e protocol is an additional random access protocol that enables collisions to be reduced. What is called Controlled Contention gives the hybrid coordinator an opportunity of learning what stations need to be queried at what times with regard to their wishes to transmit. The controlled contention mechanism allows stations to request to be allocated polled TXOPs by sending a source query, without interfering with other (E)DCF traffic.

It is an object of the invention to specify methods for medium access by a multi-channel device on a transmission system having at least two channels, which methods give terminals not having the performance feature of channel grouping the opportunity of transmitting and receiving on said transmission systems, i.e. methods that make it possible for single-channel and multi-channel devices to coexist. Methods are to be specified for a centralized mechanism and a decentralized mechanism.

The object is achieved in accordance with the invention by a method for access to a medium by a multi-channel device, which medium comprises a transmission system having at least two channels, on which a message to be transmitted comprises at least a preamble, a header and a succeeding control or data section of a frame, and the preamble and header of the message are repeated on all the channels. As a result of the control information in a frame being repeated on every channel, even a single-channel device is able to pick up the preambles and headers and perform a standards-compliant waiting process, possibly with a random backoff time. If the PHY and the MAC headers were not repeated on every frequency channel, single-channel devices would not recognize the transmission and would interpret it is as interference that blocks their channel for an indeterminate length of time.

In one embodiment of the invention, the preamble and header are repeated in parallel on all the channels. The parallel transmission of these parts of the message cannot begin until all the channels are free. Simulations have shown that the loss in data transmission rate that occurs as a result of the parallel transmission is relatively slight.

In a further embodiment, the succeeding control or data section of a frame is taken from the group request-to-send (RTS), clear-to-send (CTS), acknowledgement (ACK) or data (DATA).

In a special embodiment of the invention, the multi-channel device operates to standard IEEE 802.11, i.e. 802.11e or 802.11n having a medium access control (MAC) protocol, and it is not only the preambles and headers that are repeated on all the channels but also at least some of the items of information belonging to the MAC protocol.

If the medium access takes place under standard IEEE 802.11, i.e. 802.11e, the RTS, CTS and ACK control frames are transmitted on all the channels, which means that the single-channel devices set their network allocation vectors (NAVs) on the basis of the information in the RTS/CTS data packets. The setting of the NAV causes a counter to start, and no attempt is made to access the radio transmission medium until a target count has been reached.

The object is also achieved in accordance with the invention by a method for access to a medium by a multi-channel device, which medium comprises a transmission system having at least two channels that the multi-channel device intends to call upon for transmission, which method has the following steps
  scanning by the multi-channel device of all the channels to be called upon for transmission,
  finding that a single one of these channels is idle or that a back-off by the device itself is underway on this channel,
  blocking of this channel to other devices by the multi-channel device,
  further scanning of the other channels to be called upon and blocking or reserving thereof on finding that the channel concerned is idle or that a backoff is underway thereon.

What is finally achieved as a result of the successive blocking of individual channels is a state where all the channels to be called upon for transmission are idle. Other devices that scan a blocked channel recognize that the channel is not idle and therefore do not themselves begin a transmission. The transmission of the message can then be performed with grouped channels and hence at a high data rate.

In one embodiment, the blocking of a channel that is idle is performed by the multi-channel device and the receiving device, each of which emits a reserving message.

In one embodiment, the reserving message is implemented in the form of RTS and CTS frames that are transmitted by the following steps
  transmission of an RTS frame on the free channel by the multi-channel device, so that devices in the area surrounding the multi-channel device that is transmitting will set their NAVs, transmission of a CTS frame on the free channel by the receiving device, so that stations in the area surrounding the receiving station will set their NAVs.

The multi-channel device is able to carry out its transmission with channel grouping in this case, on all the channels that it has itself previously blocked.

In one embodiment, the blocking of a channel that is idle for a predetermined period of time is performed by starting the transmission by the multi-channel device on the single channel, doing so alternatively with or without an RTS-CTS mechanism. What the RTS-CTS mechanism entails is
optional transmission of an RTS frame on the free channel by the multi-channel station,
optional transmission of a CTS frame by the receiving station and
transmission of a data frame on the free channel by the multi-channel station (and hence blocking of the channel).

The object is also achieved in accordance with the invention by a method for access to a medium by a multi-channel device, which medium comprises a transmission system having at least two channels that the multi-channel device intends to call upon for transmission, in which method a third device (independent of the transmitter and receiver) reserves or blocks the channels in the channel group for the multi-channel device that wishes to transmit. This third device has assumed responsibility on the network for emitting the synchronizing beacon.

In one embodiment, the third device is responsible for coordinating medium access to a plurality of channels.

In one embodiment, in the event of individual channels in the channel group not becoming free simultaneously, the third device causes, alternatively
(a) one channel or individual channels to be blocked until such time as all the channels in the channel group have become free, or
(b) a channel that has become free to be assigned immediately to the multi-channel device that wishes to transmit.

In one embodiment, the medium access is performed under standard IEEE 802.11, i.e. 802.11e or 802.11n, and said third device is generally the so-called hybrid coordinator or point coordinator. The centralized reservation of the channels is performed by the third device, which is responsible for emitting the beacon on all the channels in the channel group and at the same time keeps free or reserves all the channels in the channel group for the multi-channel station that wishes to transmit. If said third device or station is responsible for coordinating medium access to all the channels, it can make the reservations for the devices on all the channels in such a way that phases able to be used simultaneously are provided for the multi-channel devices on all the channels in their channel groups. Should the individual channels in the channel group nevertheless not become free simultaneously, there are two different ways in which said third station is able to secure the channel for the multi-channel station until all the channels in the channel group become free.

In a preferred embodiment of the method, the medium access is performed under standard IEEE 802.11, i.e. 802.11e or 802.11n, and said third device is the hybrid coordinator or point coordinator.

In a further embodiment of the method, the point coordinator or hybrid coordinator transmits what is called beacons in parallel on all the channels. The transmission may if required be performed simultaneously or in synchronized fashion.

The method in accordance with the invention can be employed on a transmission system using the Standard Universal Mobile Telecommunication System (UMTS).

These and other aspects of the invention are apparent from and will be elucidated with reference to the embodiments described hereinafter.

In the drawings:

FIG. 2 is a time-based diagram of a prior art transmission. The transmission always takes place on only one channel even when a channel is idle, as channel 3 (ch 3) is in the present case.

Figure 1:
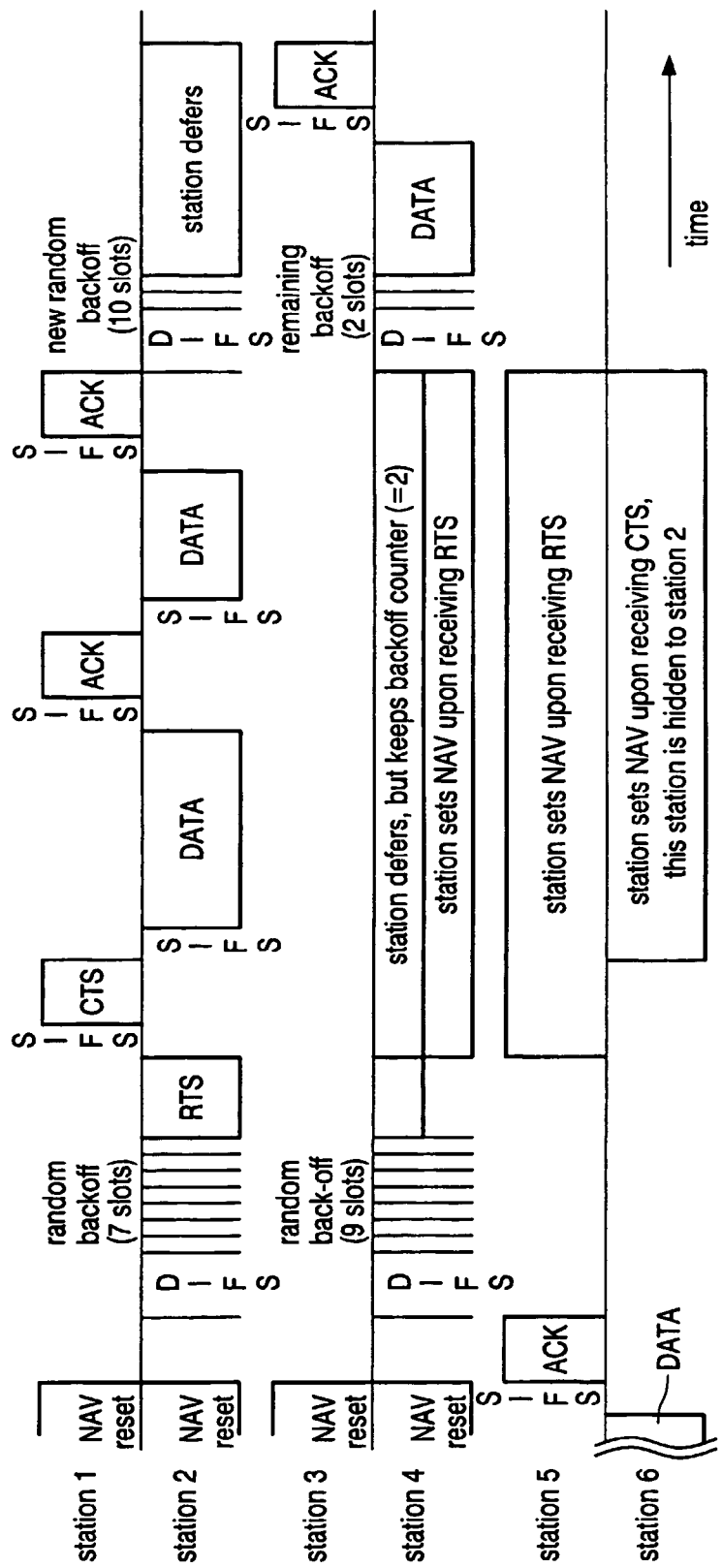
Figure 2:
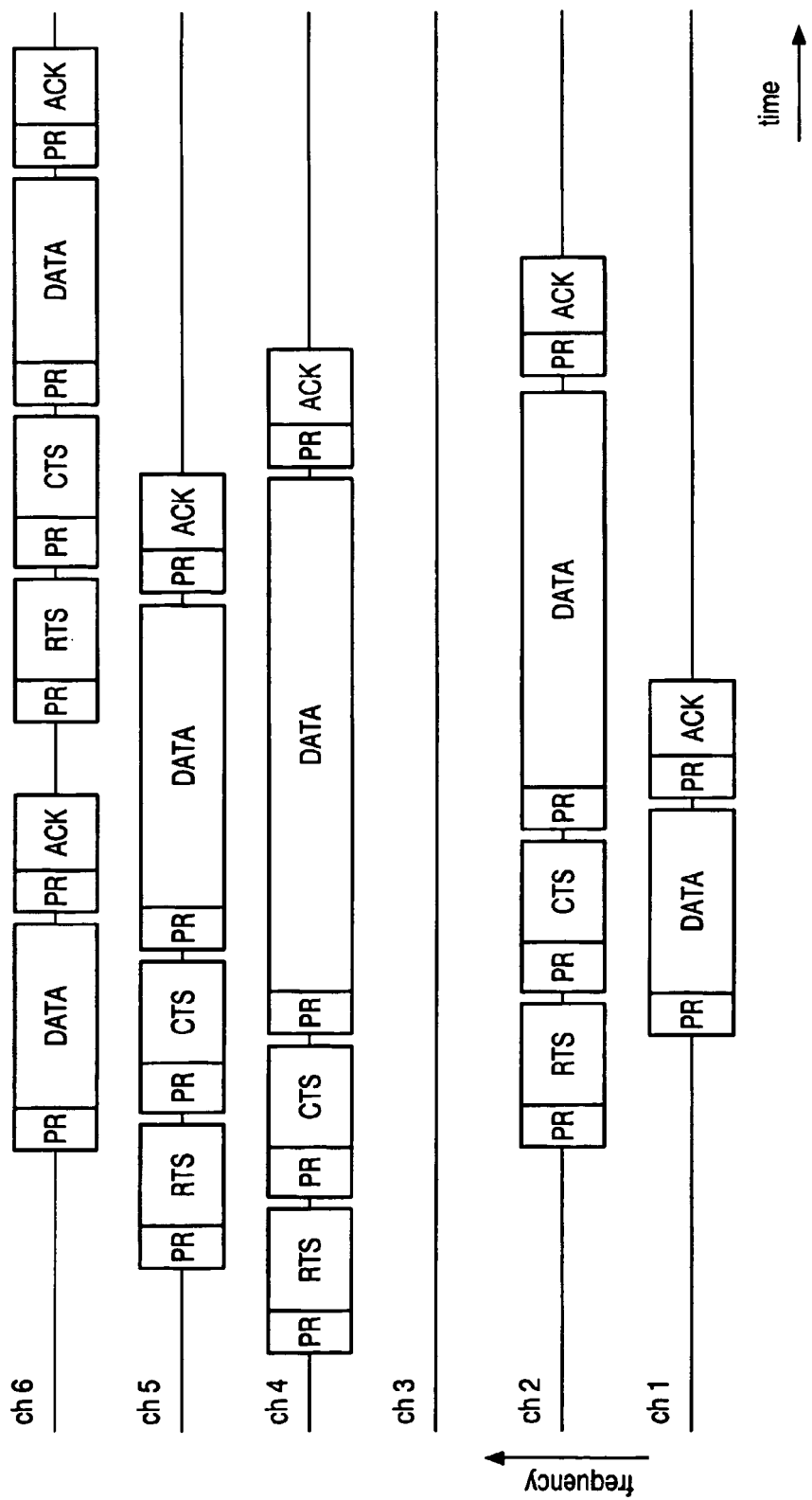
FIG. 2 is a time-based diagram of a prior art transmission.
Figure 3:
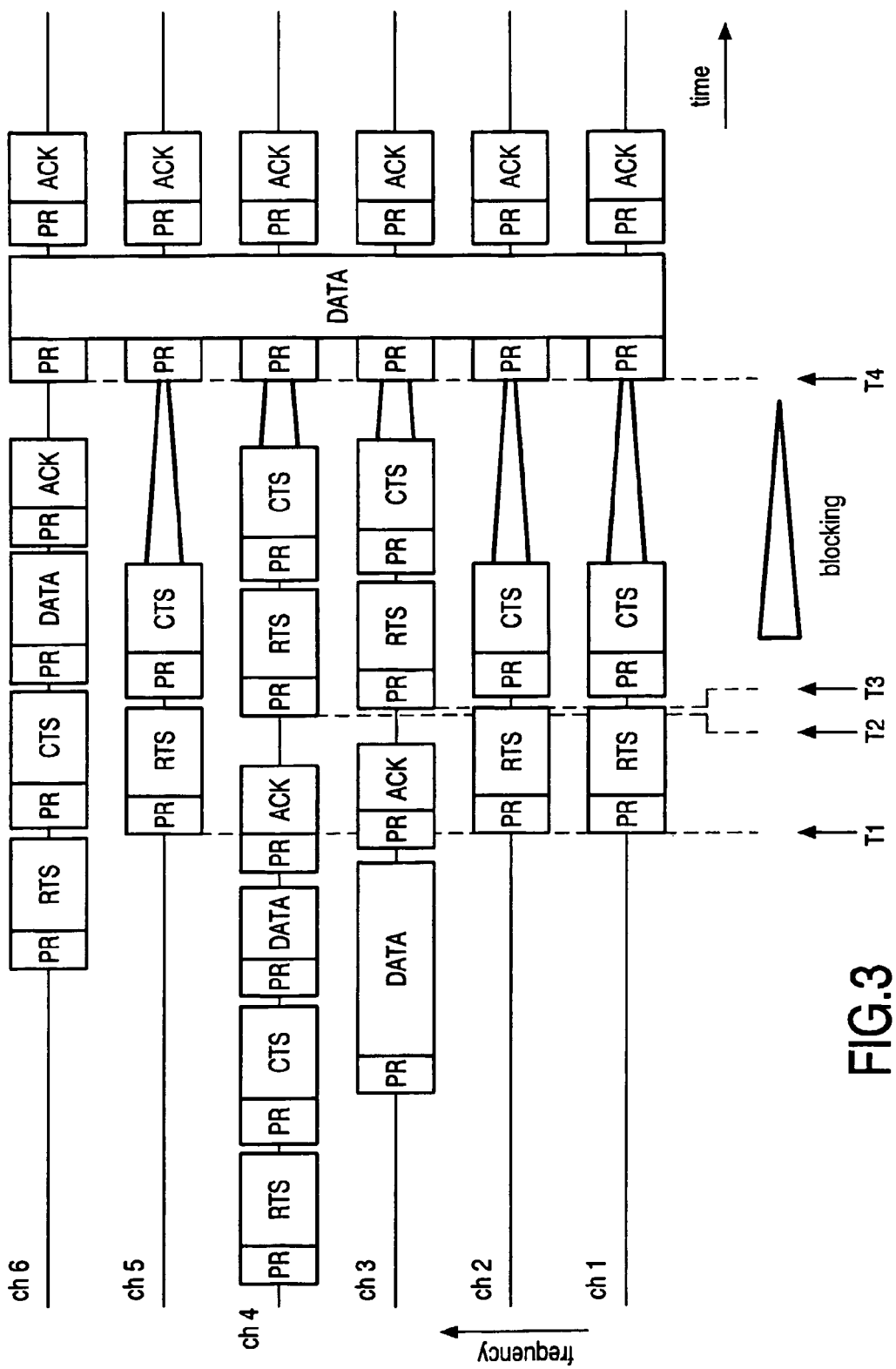
FIG. 3 is a time-based diagram of a first variant of the method in accordance with the invention.

FIG. 3 is a time-based diagram of a first variant of the method in accordance with the invention. Possible examples of messages are shown on individual ones of six channels. Two stations usually communicate on a channel by alternately transmitting an RTS frame, a CTS frame, a DATA frame and an ACK frame. At time $T_1$, a multi-channel device intends to start transmitting data using channel grouping. In the present example, scanning of the six channels shows that channels 1, 2 and 5 are idle, whereupon, following a preamble and header PR, an RTS frame is first transmitted and a CTS frame is then received. On reception of the three CTS frames, which are parallel in this case, channels 1, 2 and 5 are blocked, which means that any other stations, regardless of whether they are single-channel or multi-channel devices, have set their NAVs. At time $T_2$, the multi-channel device detects that channel 4 is idle, whereupon the RTS-CTS procedure is performed and this channel is thus blocked. The same thing happens with channel 3 at time $T_3$. Once five out of six channels have been blocked, the transmission of data starts at time $T_4$, when the final channel too, namely channel 6, is recognized to be idle. The preamble and header PR having been transmitted on the six individual channels, the transmission of the data DATA takes place using channel grouping, by which means a higher data rate is attained. On completion of the transmission of the data, the transmitting multi-channel device receives on each individual channel, following a preamble and header PR, an acknowledgement frame ACK. An advantage of this variant is that the transmission of data starts at a fixed, high data rate right at the outset and does so simultaneously on all the channels.

Figure 4:
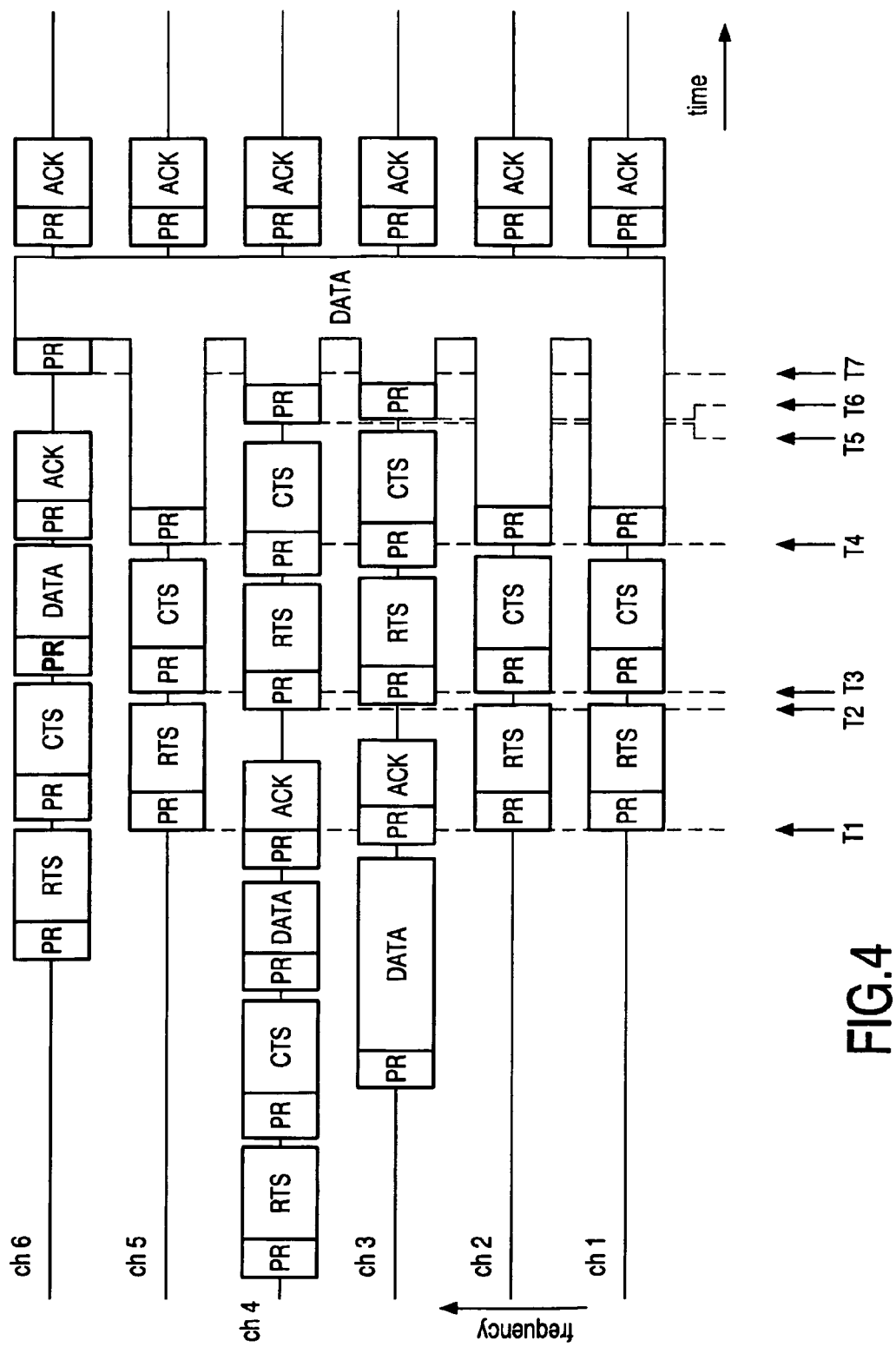
FIG. 4 is a time-based diagram of a second variant of the method in accordance with the invention.

FIG. 4 is a time-based diagram of a second variant of the method in accordance with the invention. In this example, the messages and the busy/idle states on the channels before the scanning by the multi-channel device begins are assumed to be the same as in FIG. 3. However, on channels that are in the idle state, the transmission of data is begun for the purpose of blocking them, which happens at time $T_4$ in this case. On other channels, transmission begins (possibly after a pause) as soon as it is detected that a channel is idle, which is detected to be the case on channel 4 at time $T_5$ and on channel 3 at time $T_6$ in the present case. At time $T_7$, the final channel, namely channel 6, is brought in as well. On this channel, the message first begins with a preamble and header. Following this, channel grouping then takes place for the DATA frame using all six channels. At the beginning $T_4$ of the transmission of the data, three individual channels are used in parallel and only at time $T_7$ is the bandwidth increased by channel grouping.

It is true of all three diagrams that a space is shown between the end of a control frame and the start of a preamble and header, which space is intended to show that there may be a brief pause here.

The invention claimed is:

1. A method for accessing a medium by a multi-channel device, in which the medium comprises a transmission system having at least two channels, the method comprising:
recognizing an idle state and a back-off state;
determining whether the idle state or the back-off state is underway on each channel of the at least two channels that are an object of channel grouping,
transmitting a message including a preamble and header (PR) and a control section on each channel determined to be either idle or having the back-off underway of the at least two channels that are an object of channel grouping to reserve the at least two channels, such that a single channel device detects the preamble and header and performs a process according to control information included in the control section, wherein the preamble and header (PR) are repeated in parallel on the at least two channels.

2. The method of claim 1, wherein the message is one of a request-to-send (RTS), clear-to-send (CTS), or acknowledgement (ACK) type.

3. The method of claim 1, wherein the multi-channel device operates in compliance with IEEE 802.11 standard and a medium access control (MAC) protocol, the method further comprises repeating information belonging to the MAC protocol on the at least two channels.

4. The method of claim 1, wherein access to the medium takes place under IEEE 802.11 standard, the method further comprising transmitting request-to-send (RTS), clear-to-send (CTS), and acknowledgment (ACK) control frames on the at least two channels, and setting network allocation vectors (NAVs), by single channel devices, based on information in the RTS/CTS control frames.

5. The method of claim 1, further comprising:
employing Standard Universal Mobile Telecommunication System (UMTS) as the transmission system.

6. A method for accessing a medium by a multi-channel device, the medium including a transmission system having at least two channels that the multi-channel device intends to call upon for transmission, the method comprising:
scanning, by the multi-channel device, the at least two channels to be called upon for transmission,
recognizing an idle state and a back-off state;
determining whether the idle state or the back-off state is underway on a single one of the scanned channels;
blocking the single channel determined to be one of either idle or having the back-off underway to other devices by the multi-channel device by transmitting a message including a preamble and header (PR) and a control section, wherein the preamble and header (PR) are repeated in parallel on the at least two channels, such that a single channel device detects the preamble and header and performs a process according to control information included in the control section,
further scanning the other channels to be called upon for transmission and blocking or reserving the other channels based on a determination that a scanned channel is one of either idle or that a back-off is underway by transmitting another message on the scanned channel.

7. The method of claim 6, further comprising:
blocking the channel by the multi-channel device and a receiving device, each of the devices emitting the message.

8. The method of claim 7, wherein the message is implemented in the form of RTS and CTS frames, the method further comprising:
transmitting an RTS frame on a free channel by the multi-channel device, so that devices in the area surrounding the multi-channel device that is transmitting will set their network allocation vectors (NAVs), and
transmitting a CTS frame on the free channel by the receiving device, so that stations in the area surrounding the receiving station will set their NAVs.

9. The method of claim 7, further comprising transmitting with channel grouping, by the multi-channel device, on all channels that it has previously blocked.

10. The method of claim 6, further comprising
blocking a channel by starting the transmission by the multi-channel station on the single channel, wherein the transmission can be made with or without an RTS-CTS mechanism.

11. A method for accessing a medium by a multi-channel device, the medium comprises a transmission system having at least two channels that the multi-channel device intends to call upon for transmission, wherein a message to be transmitted on the medium comprises a preamble and a header (PR) followed by at least one of a control section or data section, the method comprising:
scanning the at least two channels to be called upon for transmission,
recognizing an idle state and a back-off state;
determining whether the idle state or the back-off state is underway on each channel of the at least two channels to be called upon for transmission,
repeating the preamble and header (PR) of the message on all channels to be called upon for transmission that are determined to be either idle or having a back-off underway, and
reserving or blocking, by a third device independent of a transmitter and receiver of the message, the channels in a channel group for the multi-channel device that intends to transmit, such that a single channel device detects the preamble and header and performs a waiting process.

12. The method of claim 11, further comprising:
coordinating, by the third device, access to the medium for a plurality of channels.

13. The method of claim 11, wherein in the event of individual channels in the channel group not becoming free simultaneously, the third device causes, alternatively,
blocking one channel or individual channels until such time as all the channels in the channel group have become free, or
assigning a channel that has become free immediately to the multi-channel device that intends to transmit.

14. The method of claim 11, wherein the third device is a hybrid coordinator or point coordinator, the method performing the medium access under standard IEEE 802.11.

15. The method of claim 14, further comprising:
transmitting, by the point coordinator or hybrid coordinator, beacons in parallel on all the channels.

16. A multi-channel device for accessing a medium, the medium comprises a transmission system having at least two channels, the multi-channel device performing the method of claim 1 for accessing the medium.

17. A wireless network comprising a transmission system having at least two channels and at least one multi-channel device as claimed in claim 16.

18. A communication device comprising:
one or more transmit antennas configured to transmit on at least two channels; and
a computer processor coupled to the one or more transmit antennas and configured to recognize an idle state and a back-off state, determine whether the idle state or the back-off state is underway on each channel of the at least two channels that are an object of channel grouping, transmit a message including a preamble and header (PR) and a control section on each channel determined to be either idle or having the back-off underway of the at least two channels that are an object of channel grouping to reserve the at least two channels, such that a single channel device detects the preamble and header and performs a process according to control information included in the control section, wherein the preamble and header (PR) are repeated in parallel on the at least two channels.

19. The communication device of claim 18, wherein the message is one of a request-to-send (RTS), clear-to-send (CTS), or acknowledgement (ACK) type.

20. The communication device of claim 18, wherein the multi-channel device operates in compliance with IEEE 802.11 standard and a medium access control (MAC) protocol, the method further comprises repeating information belonging to the MAC protocol on the at least two channels.

21. The communication device of claim 18, wherein access to the medium takes place under IEEE 802.11 standard, the computer processor being further configured to transmit or receive request-to-send (RTS), clear-to-send (CTS) and acknowledgment (ACK) control frames on the at least two channels, and wherein network allocation vectors (NAVs) are set, by single channel devices, based on information in the RTS and CTS control frames.

22. A communication device comprising;
one or more transmit antennas configured to communicate utilizing at least two channels of a transmission system; and
a computer processor coupled to the one or more transmit antennas and configured to scan the at least two channels, recognize an idle state and a back-off state, determine whether the idle state or the back-off state is underway on a single one of the scanned channels, block the single channel determined to be one of either idle or having the back-off underway to other devices by the multi-channel device by transmitting a message including a preamble and header (PR) and a control section, wherein the preamble and header (PR) are repeated in parallel on the at least two channels, such that a single channel device detects the preamble and header and performs a process according to control information included in the control section,
the computer processor being further configured to scan the other channels and block or reserve the other channels based on a determination that the scanned channel is one of either idle or that a back-off is underway by transmitting another message on the scanned channel.

23. The communication device of claim 22, wherein the message is implemented in the form of transmit request-to-send (RTS) and clear-to-send (CTS) frames, the computer processor being configured to transmit an RTS frame on a free channel by the multi-channel device, and receive a CTS frame on the free channel from the receiving device.

24. The communication device of claim 22, wherein the computer processor is configured to transmit on all channels that were previously blocked.

25. The communication device of claim 22, wherein the computer processor is configured to block a channel by starting the transmission by the multi-channel station on the single channel, wherein the transmission can be made with or without an RTS-CTS mechanism.

26. A communication device comprising;
one or more transmit antennas configured to communicate utilizing at least two channels of a transmission system; and
a computer processor coupled to the one or more transmit antennas and configured to scan the at least two channels to be called upon for transmission, recognize an idle state and a back-off state, determine whether the idle state or the back-off state is underway on each channel of the at least two channels to be called upon for transmission, and repeat the preamble and header (PR) of the message on all channels to be called upon for transmission that are determined to be either idle or having a back-off underway,
wherein a message to be transmitted on the medium comprises a preamble and a header (PR) followed by at least one of a control section or data section, and
wherein channels in a channel group of the communication device are reserved or blocked by a third device independent of a transmitter and receiver of the message such that a single channel device can detect the preamble and header and perform a waiting process.

27. The communication device of claim 26 wherein access to the medium for a plurality of channels is coordinated by the third device.

* * * * *